United States Patent
Boehl

(10) Patent No.: US 9,599,453 B2
(45) Date of Patent: Mar. 21, 2017

(54) DEVICE AND METHOD FOR PROCESSING SIGNALS WHICH REPRESENT AN ANGULAR POSITION OF A MOTOR SHAFT

(75) Inventor: Eberhard Boehl, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 1207 days.

(21) Appl. No.: 13/637,106

(22) PCT Filed: Mar. 31, 2011

(86) PCT No.: PCT/EP2011/055004
§ 371 (c)(1),
(2), (4) Date: Dec. 18, 2012

(87) PCT Pub. No.: WO2011/121069
PCT Pub. Date: Oct. 6, 2011

(65) Prior Publication Data
US 2013/0082693 A1   Apr. 4, 2013

(30) Foreign Application Priority Data
Mar. 31, 2010 (DE) .......... 10 2010 003 526

(51) Int. Cl.
*G01B 7/30* (2006.01)
*G01D 5/245* (2006.01)

(52) U.S. Cl.
CPC ............ *G01B 7/30* (2013.01); *G01D 5/2451* (2013.01)

(58) Field of Classification Search
CPC .... G01D 5/245; G01D 5/2451; G01D 5/2452; G01D 5/2454; G01D 5/2455; G01D 5/2457; G01D 5/2458; G01D 5/247
See application file for complete search history.

(56) References Cited

U.S. PATENT DOCUMENTS 4,604,725 A * 8/1986 Davies ................. G01D 5/2495
250/231.18
4,906,992 A * 3/1990 Wingate ............... G01D 5/2497
341/13
(Continued)

FOREIGN PATENT DOCUMENTS

CN   1319176   10/2001
CN   1755798   4/2006
(Continued)

OTHER PUBLICATIONS

International Search Report for PCT/EP2011/055004, dated Nov. 10, 2011.

*Primary Examiner* — Huy Q Phan
*Assistant Examiner* — Adam Clarke
(74) *Attorney, Agent, or Firm* — Gerard Messina

(57) ABSTRACT

In an apparatus and a method for processing signals that represent an angular position of a shaft of a motor, a storage unit for storing arrival times of the signals in a memory is provided, the storage unit additionally evaluating a rotation direction datum of the shaft. Storage of the times in the memory is performed in a first sequence in the event of a rotation of the shaft in a first direction, and storage in the memory is performed in a second sequence that is opposite to the first sequence in the event of a rotation of the shaft in a second direction that is opposite to the first direction.

16 Claims, 3 Drawing Sheets

(56) References Cited

U.S. PATENT DOCUMENTS

| | | | | |
|---|---|---|---|---|
| 4,914,437 A * | 4/1990 | Kibrick | ............... | H03M 1/308 250/231.18 |
| 5,137,104 A * | 8/1992 | Etoh | ................... | B60K 31/047 180/179 |
| 2003/0213896 A1 * | 11/2003 | Stridsberg | ............ | G01D 5/2451 250/231.13 |
| 2005/0096865 A1 * | 5/2005 | Sugiura | ............... | F02D 41/009 702/151 |
| 2005/0213111 A1 * | 9/2005 | Suzuki | .................. | G01D 5/165 356/617 |

FOREIGN PATENT DOCUMENTS

| | | |
|---|---|---|
| CN | 101251391 | 8/2008 |
| DE | 26 21 179 | 12/1977 |
| DE | 40 15 099 | 11/1990 |
| DE | 199 33 844 | 1/2001 |
| EP | 0 094 828 | 11/1983 |
| EP | 0 332 244 | 9/1989 |

\* cited by examiner

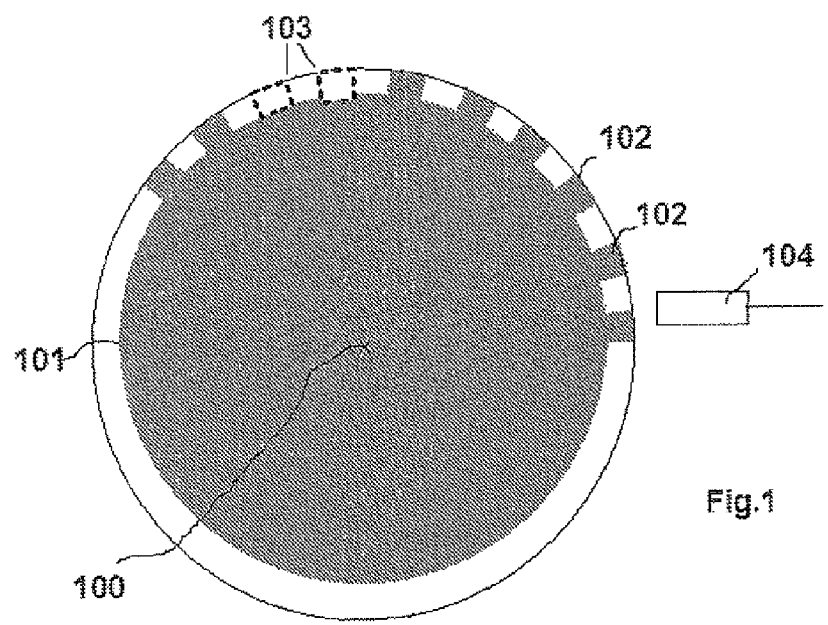
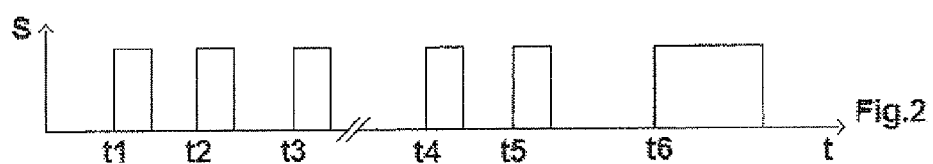
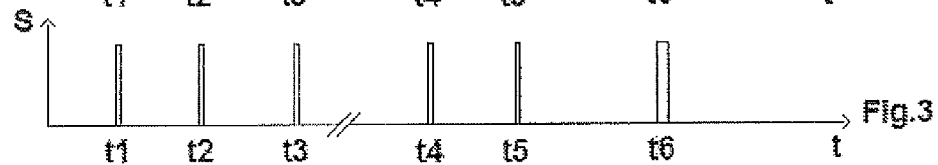
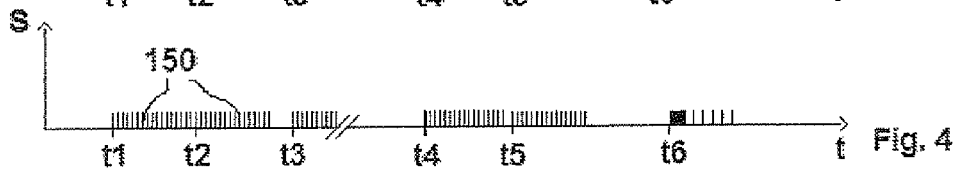

DEVICE AND METHOD FOR PROCESSING SIGNALS WHICH REPRESENT AN ANGULAR POSITION OF A MOTOR SHAFT

BACKGROUND OF THE INVENTION

1. Field of the Invention

The present invention relates to an apparatus and a method for processing signals that represent an angular position of a shaft of a motor.

2. Description of the Related Art

Published German patent application document DE 199 33 844 A1 has already disclosed an apparatus and a method for processing signals that represent an angular position of a shaft of a combustion engine, in which a rotation direction of the shaft is detected.

BRIEF SUMMARY OF THE INVENTION

The apparatus and the method according to the present invention have the advantage that times are stored in a manner that is particularly advantageous for further processing of the data. Thanks to this type of storage, a particularly simple logic system can be used both to deposit the data and for the subsequent calculations. In addition, periodic events in particular can be predicted more accurately if the events that occurred one period earlier are taken into account in the new calculation. A particularly simple apparatus and a particularly simple method for processing the signals that represent the angular position of the shaft is thus created.

Storage in a specific sequence allows the calculations, which usually use a current, most-recently stored time and preceding times, to be configured particularly simply. These calculations are simplified in particular by the fact that an address pointer is provided which refers to the corresponding memory locations. The corresponding sequences are generated by incrementing or decrementing the address pointer. A digital PLL (DPLL) circuit, which generates position pulses for angular positions between the signals that represent an angular position of the shaft, can moreover be provided. These can be then corrected using compensation pulses, as a function of the rotation direction of the shaft. Upon a change in rotation direction, the counting direction of a position counter is then also correspondingly changed. For the purpose of correcting the position counter, the correction means can either add or omit pulses.

BRIEF DESCRIPTION OF THE DRAWINGS

FIG. 1 shows a shaft of a motor and a sensor apparatus for generating signals that represent an angular position of said shaft.

FIG. 2 shows signals of the sensor of FIG. 1.

FIGS. 3 and 4 show post-processed signals that are derived from the signals of FIG. 2.

BRIEF DESCRIPTION OF THE INVENTION

Figure 5:
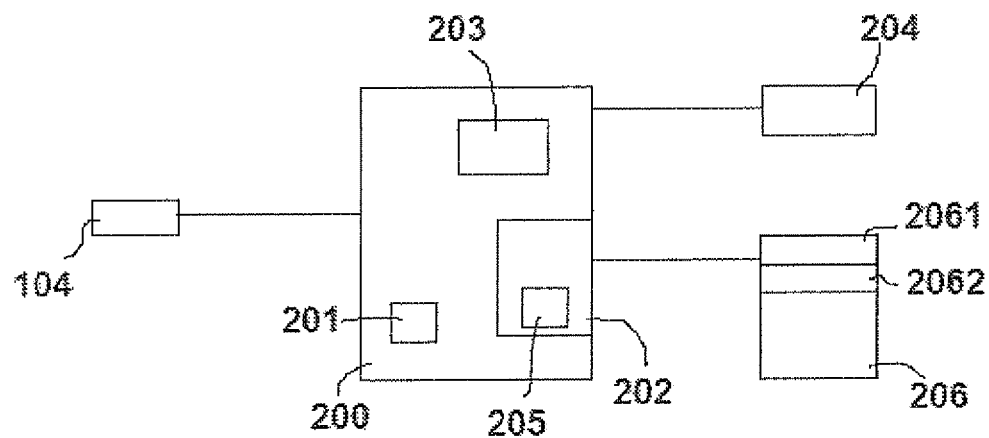
FIG. 5 schematically depicts the apparatus according to the present invention.

FIG. 1 shows a shaft 100 of a motor, for example a crankshaft of an internal combustion engine. An encoder wheel 101, which has on its outer circumference a tooth structure 102, is rigidly connected to the shaft. An encoder wheel 101 of this kind can be, for example, a metallic encoder wheel, and the external tooth structures 102 are introduced into the outer circumference of the metallic encoder wheel 101 by way of corresponding milled recesses. Tooth structures 102 are, for example, introduced in such a way that they are disposed at constant angular spacings, for example 6°. The entire circumference of encoder wheel 101 would then have 60 tooth structures 102; for reasons of clarity, FIG. 1 depicts only a few, which moreover each cover an angle range of more than 6°. In order to characterize a particular position of shaft 100, two tooth structures 102 are removed at a defined angular position, so that a tooth gap 103 is produced. This tooth gap 103 serves to unequivocally characterize a specific position of shaft 100. This disposition of the encoder disk on a crankshaft of an internal combustion engine is already known, for example, from published German patent application document DE 199 33 844 A1. Tooth structures 102 travel past a sensor 104, and sensor 104 outputs a High signal level when a tooth structure 102 is located directly in front of sensor 104, and a Low signal level when the gap between two tooth structures 10 is located directly in front of sensor 104. The output signal of sensor 104 is depicted by way of example in FIG. 2.

In FIG. 2, the output signal S of sensor 104 is plotted against time t. As is evident, the signal S of sensor 104 jumps from a Low level to a High level at time t1, and maintains that High level as long as tooth structure 102 is moving past sensor 104. When tooth structure 102 has then moved past sensor 104, the signal level S drops back to a value of 0. At time t2 the signal level then jumps back up to the High value, since the next tooth structure 102 is appearing in front of sensor 104. A jump in the signal level S is shown correspondingly in FIG. 2 at the respective times t1, t2, t3, t4, t5, and t6. The signals that are shown at times t1, t2, t3, t4, t5 pertain to a normal rotation of the shaft in one direction. A reversal of the rotation direction of the shaft occurs between times t5 and t6. The consequences arising therefrom will be discussed later on.

For further processing of the signals of sensor 104, what is taken into account for post-processing is not the signals according to FIG. 2, but instead only the positive switching edges, i.e. from the Low to the High level. FIG. 3 shows the in reaction to these positive switching edges from signal level S=Low to signal level S=High. The immediate sensor signals of FIG. 2 are converted into the signals that are shown in FIG. 3 by pre-processing the sensor signals either directly in sensor 104 or in a downstream processing unit. A square-wave signal having a defined width is generated for each positive switching edge. In the event of a rotation of shaft 100 in a first direction, as is the case at times t1, t2, t3, t4, and t5, a square-wave signal having a defined width of, for example, 45 µs is generated. When a rotation of shaft 100 in a direction opposite to the first direction is ascertained, a signal of a different width is generated, as shown at time t6 in FIG. 3. The signal at time t6 is clearly distinguishable in terms of its width. For example, the signal that is associated with time t6 can have a width of 90 µs. As depicted in FIG. 3, the width of these signals is shown as being exaggeratedly wide. A comparison of FIGS. 3 and 4 therefore results in an overlap of the signals, i.e. in FIG. 4 further signals, which are based on an evaluation of the width of the signals of FIG. 3, are already generated. This is not a real effect, however, but is caused only by the exaggerated width of the depiction in FIG. 3. Because of this difference in width, the rotation direction information can additionally be used for post-processing of the signals of sensor 104. DE 199 33 844 A1, for example, indicates the manner in which it is possible, on the basis of signals of sensor 104, to ascertain the direction in which shaft 100 is moving. Also known, however, are other sensors, or multiple assemblages of offset sensors, with which the rotation direction of shaft 100 can likewise be detected.

Further processing of the signals from FIG. 3 will now be explained with reference to FIG. 4 and FIG. 5. FIG. 5 once again shows sensor 104 that conveys to signal processing apparatus 200 the signals that have been explained with reference to FIG. 3. Signal processing 200 is an apparatus for processing signals that represent an angular position of the shaft of a motor. This signal processing apparatus 200 has internally a storage means 202 and a digital phase-locked loop (DPLL) 203. The internal interconnections inside evaluation means 200 are not depicted here for reasons of clarity. It has been ensured, however, that each of the parts of signal processing apparatus 200 that are described below is supplied with all the information necessary for its operation. The individual parts can be embodied as a hard-wired switching logic system, or can also be embodied at least in part by way of a universal circuit that executes a program.

Signal processing apparatus 200 further have a timer 201 and an address pointer 205. Signal processing apparatus 200 are connected via corresponding leads to a position counter 204 and to a memory 206. Memory 206 has multiple memory locations, of which two memory locations 2061 and 2062 are depicted by way of example. Position counter 204 and memory 206 can of course also be constituents of signal processing apparatus 200. Timer 201 and address pointer 205 can likewise also be implemented as external components.

The apparatus as shown in FIG. 5 works as follows: Whenever a signal arrives, as shown in FIG. 3 at times t1, t2, t3, t4, and t5, the storage means reads in from timer 201 the arrival time of the signal, and stores that time in memory 206. Storage in memory 206 occurs in a predefined sequence, i.e. for example, storage of the arrival time of the signal at time t1 occurs in memory location 2061, which makes it clear that storage of the arrival time of the signal at time t2 arrives then occurs in memory location 2062. This fixed sequence of storage in memory 206 unambiguously defines, for further calculations, where the current time (i.e. the most recently received time) is stored, and where the preceding time is stored. The defined sequence of storage of the successive times clearly defines, for subsequent calculations, where the relevant time datum is then to be found. Address pointer 205, which points to a defined location in memory 206, is provided for this purpose. For example, address pointer 205 can contain the information as to the memory location at which data were most recently loaded. Alternatively, the address pointer can also of course point to the memory location that is to be used next in the sequence. The memory location to which the address pointer points is not important in principle, but it must be possible to ascertain clearly, based on the data in address pointer 205, what the relative position of the next, memory operation is, and where the time information of preceding memory operations is located.

The different pulse widths of signal S that are shown in FIG. 3 as a function of the rotation direction of shaft 100 is evaluated in evaluation means 200 and used to influence storage in memory 206. When shaft 100 is rotating in a first direction, the sequence of storage in memory 206 then occurs in a first sequence. When shaft 100 is rotating in the opposite direction, storage in memory 206 then occurs in the opposite sequence. For example, storage occurs from top to bottom for a clockwise rotation of shaft 100, and storage occurs from bottom to top for a counterclockwise rotation of shaft 100. This different sequence of storage in memory 206 is brought about by a corresponding influence on address pointer 205. When address pointer 205 refers respectively to the next free memory location, address pointer 205 is incremented at each of the signals of FIG. 3 in the event of rotation in the first direction, and the address pointer is decremented at each signal in the event of rotation in the opposite direction.

FIG. 3 depicts, for example, a change in rotation direction with reference to the signals between times t5 and t6. Starting at time t6, at which the fact that the motor is now running in reverse was detected, the address pointer is now no longer incremented, but instead decremented. Storage of the subsequent times in memory 206 therefore occurs no longer from top to bottom, but instead from bottom to top. In accordance with this sequence, consideration must be given, in the context of further calculations, to the fact that the further values are then stored in that sequence in memory 206.

The times stored in memory 206 are significant, for example, for the operation of digital phase-locked loop (DPLL) 203. The function of DPLL 203 is to generate, from the individual pulses of FIG. 3, a plurality of sub-pulses, which are referred to hereinafter as "position pulses." This may easily be seen by comparing FIGS. 3 and 4, for example between times t1 and t2. In FIG. 3, times t1 and t2 are each characterized by a short square-wave pulse. FIG. 4 shows, between times t1 and t2, a plurality of position pulses 150 that are outputted by DPLL 203 and counted in position counter 204. Position counter 204 thus always holds an accurate position of shaft 100, with a much higher resolution than would be possible as a result of the pitch of tooth structure 102. The angular position of shaft 100 can thus be gathered at any time, with high resolution (i.e. with great accuracy), from position counter 204. PLL 203 is embodied so that it always outputs an identical number of position pulses 150 between two pulses of sensor 104, as depicted in FIG. 4. For this, the DPLL calculates, on the basis of the data stored in memory 206 regarding preceding times between two pulses of sensor 104, a predicted time at which the next pulse of sensor 104 can be expected. The DPLL then outputs position pulses 150 at a frequency which is dimensioned so that exactly the predicted number of position pulses 150 is outputted by the time the next signal of sensor 104 arrives. If this prediction is not correct, either because shaft 100 has been rotating (contrary to the prediction) considerably faster or (contrary to the prediction) considerably more slowly, corresponding correction means of the DPLL must intervene for correction. This is explained in FIGS. 3 and 4 with reference to the signals at times t2 and t3. As is evident from FIG. 3, the time span between times t2 and t3 is considerably longer than between times t1 and t2. For the prediction, however, DPLL 203 has assumed that the rotation speed of shaft 100 has not slowed, and has thus, as shown in FIG. 4, outputted position pulses 150 in the interval between t2 and t3 at the same frequency as in the interval between t1 and t2. Once the predicted number of position pulses 150 has been outputted, DPLL 203 then suppresses the output of further position pulses 150, since otherwise position counter 204 would of course assume too high a value. Output of the corresponding number of position pulses 150 is therefore followed by a short interval in which no position pulses are outputted, this interval being located shortly before time t3. The output of position pulses then occurs again starting at time t3. If an unforeseen acceleration of the rotation of shaft 100 had occurred in the interval between t2 and t3, it would not have been possible, at the indicated frequency, to output the predicted number of position pulses 150 by time t3. In this case the correction means of the DPLL would have had to output additional position pulses 150 immediately after time t3, in order to establish a corresponding status of position counter 204. The result of this action is that position counter 204 always contains an accurate datum as to the angular position of shaft 100.

Upon a change in the rotation direction of shaft 100, position counter 204 must also correspondingly change its counting direction. If position counter 204 counts up in the first rotation direction, then in the event of a rotation of the shaft in a second direction that is opposite to the first direction, it must correspondingly count down. Position counter 204 can be informed of the rotation direction either by PLL 203 or by other means of signal processing apparatus 200. In any event, position counter 204 obtains the information as to whether position pulses 150 supplied from the PLL are to be added or subtracted. The change in rotation direction is explained with reference to FIGS. 3 and 4, in particular at time t6. Typically, when a reversal in direction occurs in an internal combustion engine, a definite lengthening of the spacings between two successive pulses of sensor 104 also occurs. This is depicted in FIG. 3 by the longer time interval between t5 and t6. Correspondingly, in FIG. 4 the output of position pulses 150 is terminated approximately in the middle of the interval between t5 and t6, since the predefined number of position pulses 150 was been reached approximately in the middle of that interval. It is then evident at time t6, after termination of the pulse in FIG. 3, that a reversal of direction exists. Starting at this time, position pulses 150 outputted by PLL 203 are no longer added to the position counter, but instead are subtracted. Immediately after termination of the pulse at time t6 in FIG. 3, DPLL 203 firstly outputs a rapid sequence of position pulses 150 that correspondingly decrement the status of position counter 204. These are therefore compensation pulses that correspondingly correct the status of position counter 204. These pulses correspond, in terms of their quantity, to position pulses 150 that were erroneously added to position counter 204 in the interval between t5 and t6. These are depicted in FIG. 4 as a black block immediately after time t6, since they follow one another so closely that they cannot be depicted in FIG. 4 as individual pulses. The first action is thus to correct the position counter by subtracting a corresponding number of position pulses 150. Only then does PLL 203 output normal counting pulses whose frequency is based on when, in the case of the reverse rotation, the next pulse of sensor 104 is to be expected. The pulses at considerably elevated frequency that immediately follow time t6 are thus compensation pulses in order to correct the status of position counter 204.

Figure 6:
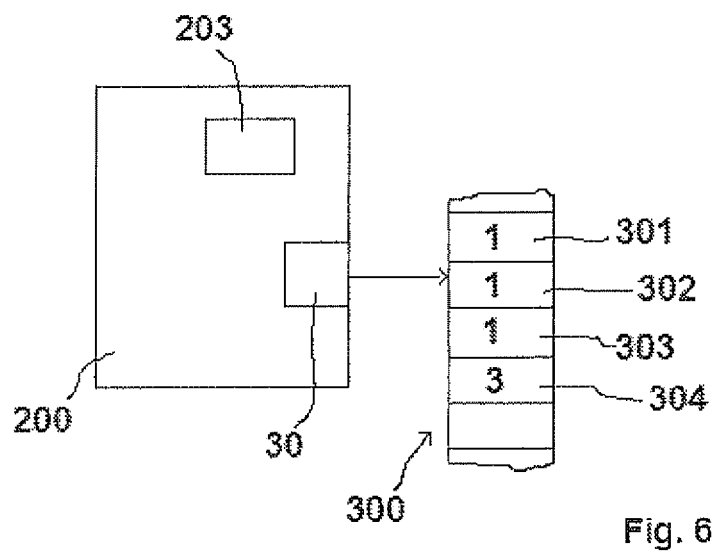
FIG. 6 shows a further address pointer.

FIG. 6 describes the use of a further address pointer 30 in signal processing circuit 200, and the significance of this further address pointer 30 for DPPL 203. Further address pointer 30 points to memory locations 301, 302, 303, 304 of a further memory 300, and at each arrival of a signal of sensor 104 (i.e. at times t1, t2, t3, t4, t5, t6 of FIG. 3), fetches the in memory 300 and makes this information available to DPLL 203. The number of memory locations 301, 302, 303 provided is the same as the number of tooth structures 102 on encoder wheel 101, or as the number of gaps provided between the teeth. For the, example as described with reference to FIG. 1, this is (60−2)=58 memory locations. The gaps can have different lengths depending on whether missing teeth are or are not to be taken into account. As depicted in FIG. 6, memory locations 301, 302, 303, which are allocated to the normal gaps between tooth structures 102, each contain the number 1, and memory location 304, allocated to gap 103 having two missing teeth, contains the number 3. These teeth correspond to the number of position pulses that DPLL 203 is intended to output. If, for a normal tooth structure 102, for example one hundred position pulses 150 are to be outputted from DPLL 203 by the time the next pulse of sensor 104 arrives, then for tooth gap 103 (where two tooth structures 102 are missing), three times as many (i.e. 300) position pulses 150 must be outputted. The address pointer is adjusted, by way of a synchronization of address pointer 30 upon startup of the internal combustion engine, in such a way that it points in each case to the memory location that indicates the number of position pulses 150 for the next tooth structure 102 or tooth gap 103. This ensures that a commensurate number of position pulses 150 is always outputted by DPLL 302.

Upon a change in the rotation direction of shaft 100, further address pointer 30 must be correspondingly changed over. If it is assumed that the information stored in memory 300 is always read out before the arrival of the pulse of sensor 104 and made available to DPPL 203, and further address pointer 30 is shifted immediately after that readout, then upon a change in rotation direction the further address pointer must be modified by four memory locations oppositely to the previous shift direction. If further address pointer 30 is incremented after each readout when the shaft is rotating in a first direction, then upon a change in rotation direction, the further address pointer must be decremented by a value of 4, and then the further address pointer is decremented at each read operation as long as the shaft is rotating in the opposite rotation direction. The number 4 is merely an example. This value of 4 must, for example, be respectively subtracted or added whenever, upon a change in direction at a signal change of sensor 104, no information is at first available yet regarding the change in direction, and the address pointer is being incremented or decremented as it was at the last sensor signal time tx, and furthermore whenever the values in memory 206 regarding the measured time interval of two teeth are stored after the corresponding interval, and whenever the information regarding the duration of an interval is fetched from profile memory 300 before the relevant interval. Under other boundary conditions, other correction values are also possible.

Instead of a further address pointer 30, it is also possible to use a different component that effects access to memory 300 relative to address pointer 205 of FIG. 5. For access to memory 300, this component would then read in the contents of address pointer 205 and add or subtract an offset. In the event of a rotation of the shaft in a first direction, for example, a value of 2 could be added to the content of address pointer 205, and the corresponding memory location could be read out from memory 300. If a change in rotation direction then occurs, the contents of address pointer 205 would then in turn simply be read out, and two memory locations would be subtracted from that value. Similarly, in a forward direction a value of 17 could be added to address pointer 205, and in a reverse direction a value of 13 could be added. The difference of 4 between forward and reverse in the case of address pointer 30 is correct only when both address pointers immediately increment or decrement with the beginning of a pulse of FIG. 3 (as previously), when the direction information of the pulse has not yet been evaluated, address pointer 205 is still pointing to the last increment (time stamp or calculated time span between the last two teeth), and address pointer 30 is pointing to the next, future increment (expected time span between the next and next but one tooth). Other difference values are also possible in another implementation. With this method it is thus also possible to ensure that what is read out from memory 300 is always the respective value from memory 300 that indicates whether DPLL 203 now needs to output a single set of position pulses, or a triple set of position pulses.

Be it noted in addition that the memory contents of memory 300 must be selected in each case in a manner adapted to tooth gap 103. For the toothed wheel according to FIG. 1 this is brought about, for example, using the number 3, since when two teeth are missing, three times the number of position pulses 150 must be outputted. If the tooth gap is smaller, for example if only one tooth is missing, then for example only twice the number of position pulses 150 would need to be outputted by the DPLL.

Figure 7:
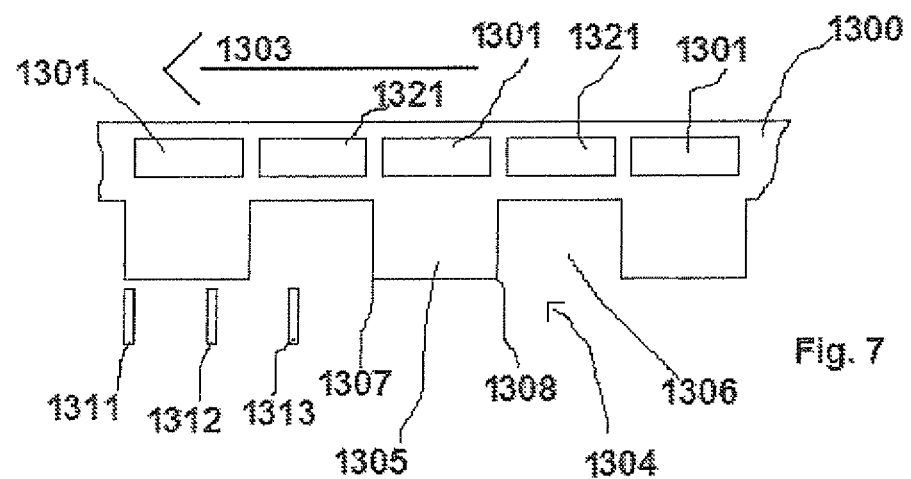
FIG. 7 shows a sensor apparatus for generating a position signal in an electric motor.

FIG. 7 schematically depicts a rotor 1300 of an electric motor. Rotor 1300 is depicted in FIG. 7 not as a round rotor but in a developed depiction, i.e. not as a round entity around a shaft but as a linear entity. This depiction of rotor 1300 serves only for simplified graphical depiction in FIG. 7.

Figure 8:
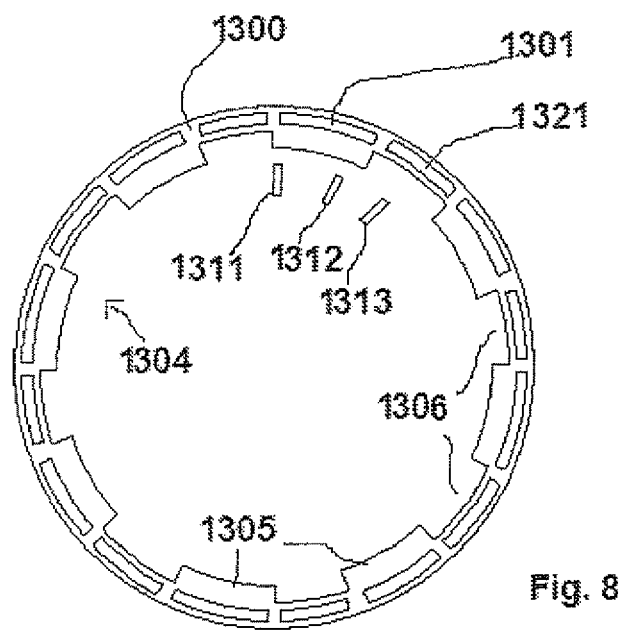
FIG. 8 shows an electric motor having eight pole pairs.

In reality, rotor 1300 is embodied as a circular structure around a shaft, as shown in FIG. 8.

FIG. 8 depicts, once again as an overview, rotor 1300 of an electric motor. The electric motor is one having eight pole pairs, i.e. eight North poles 1301 and eight South poles 1321, disposed alternatingly with one another. Associated with each pole pair 1301, 1321 is a tooth structure 1304 having a tooth 1305 and a tooth gap 1306. This Figure serves to show the overall configuration of the rotor. Details of the association between sensors and tooth gaps are explained in the more detailed depiction of FIG. 7.

Embedded in rotor 1300 are permanent magnets 1301, 1321 that, thanks to the application of alternating external magnetic fields by corresponding coils in the stator of the motor, generate a force with respect to the field of permanent magnets 1301, 1321 that moves rotor 1300, for example, in the direction shown by arrow 1303. The corresponding activation coils are not depicted here. Permanent magnets 1301 forms a magnetic North pole, and permanent magnets 1321 a magnetic South pole.

Rotor 1300 has tooth structures 1304 that are each made up of a tooth 1305 and a tooth gap 1306. Rotor 1300 is thicker in the region of tooth 1305, i.e. it forms tooth 1305, and rotor 1300 is thinner in the region of tooth gap 1306, thus forming tooth gap 1306. For the discussion to follow, it is also important that tooth 1305 possesses a front side 1307 and a back side 1308, where front side 1307 characterizes the transition from tooth gap 1306 to tooth 1305, and the back side characterizes the transition, in the motion direction of arrow 1303, between tooth 1305 and tooth gap 1306. For the discussion to follow, tooth structure 1304 shown at the left in FIG. 7 will now be referred to as a "first tooth structure," and the next tooth structure at the center of FIG. 7 as a "second tooth structure" 1304.

The rotor is constructed so that each pair of permanent magnets 1301, 1321 has a tooth structure 1304 associated with it. Disposed opposite tooth structures 1304 are three sensors 1311, 1312, 1313, the spacing of these sensors from one another being selected so that it corresponds in each case to one-third of the periodicity of tooth structures 1304. This means that the spacing between first sensor 1311 and second sensor 1312 corresponds to one-third the spacing of front sides 1307 of two successive tooth structures 1304. With this disposition of sensors 1311, 1312, 1313 and tooth structures 1304, the behavior in the event of a motion of rotor 1300 in the direction of arrow 1303 is such that a defined sequence of signals of the three sensors occurs. Sensors 1311, 1312, 1313 always deliver a logical "one" when a tooth 1305 is located directly in front of them, and a logical "zero" when a tooth gap 1306 is located in front of sensors 1311, 1312, 1313. As depicted in FIG. 7, for example, the situation is that sensors 1311 and 1312 are outputting a logical "one" and sensor 1313 a logical "zero." When rotor 1300 then moves along in the direction of arrow 1303, the signal level changes as soon as sensor 1312 is beyond back side 1308 of the first tooth. Sensor 1311 is still located opposite tooth 1305, while sensors 1312 and 1313 are both located opposite tooth gap 1306. The sensors therefore deliver the output signal "100". Upon a further motion, sensor 1313 then goes past front side 1307 of second tooth 1305, and the signal of the sensors then changes to the value "101". When rotor 1300 then moves further, both sensors 1311, 1312 are then located over tooth gap 1306 of the first tooth structure, and third sensor 1313 is in front of tooth 1305 of the second tooth structure. The sensors thus output the signal "001". As motion continues, this is followed by the signal "011" and, upon another further motion, by the signal "010." When rotor 1300 then moves along again, the signal "110" is then outputted again, the sensors then being located in front of the second tooth structure 1304 in the manner shown in FIG. 7 with regard to the first tooth structure 1304. Upon further motion in the direction of arrow 1303, this signal sequence—namely 110, 100, 101, 001, 011, 010—is repeatedly outputted. When the electric motor is moving in the opposite direction, however, this signal sequence occurs in the reverse order, so that a motion of the electric motor in one or the other direction can be clearly distinguished.

Post-processing of the signals of the three sensors 1311, 1312, 1313 is accomplished by signal processing apparatus 200 in a manner similar to that already described for the signals of sensor 104. Whenever a signal of sensors 1311, 1312, or 1313 changes in terms of signal level, the storage means reads in from a timer the arrival time of the signal, and stores that time in memory 206. Storage in memory 206 occurs in a predefined sequence, i.e. for example the arrival time of the signal transition from "110" to "100" is stored in memory location 2061, from which it is then clear that the arrival time of the signal transition from "100" to "101" is then stored in a memory location 2062. Because sensors 1311, 1312, and 1313 altogether exhibit only six states (the states "000" and "111" do not occur, as described above with regard to the sequence), storage in only six memory locations results in storage of one complete motion of rotor 1300 through one pole pair 1301, 1321. In order to investigate other influences on rotation speed as well, however, it may also be useful to provide a greater number of memory locations. The stored times are managed, as already described with reference to FIG. 5, by a corresponding address pointer 205. By way of the ascertained signal sequence of the three sensors 1311, 1312, and 1313, the rotation direction of the electric motor can be determined at each signal change. This information can be used to correspondingly count address pointer 205 in one direction or the other. A plurality of position pulses 150 are generated in OPLL 203 on the basis of the stored times, and then indicate the respective position of the electric motor. In contrast to a combustion engine, however, it is not necessary to map one complete motion of rotor 1300; all that is necessary for the purpose of applying control to the electric motor is to know the position of one pole pair, since the same initial position exists again when the rotor rotates one pole pair further.

This is the case, however, only when all the pole pairs are positioned exactly identically relative to one another, and also exactly identically relative to tooth structures 1304. If there are physical differences in the poles, it may be useful also to stored measured values for one entire mechanical revolution of the motor, since it is then possible to access, if applicable, the measured values for one revolution ago. The possible deviations are described in detail below in an example.

A further address pointer 30 and corresponding memory locations 301, 302, 303, 304 can optionally be provided even for the electric motor. In contrast to the evaluation of crankshaft signals, however, what is stored in these memory locations is not information regarding the teeth to be expected, but instead information with regard to production tolerances of the encoder wheel of the electric motor, or the disposition of the three sensors 1311, 1312, 1313. These data contain information as to how many position pulses 150 are to be expected before the arrival of the next signal transition. Production tolerances can relate to the signal sequence, proceeding periodically and successively, of the six possible states of the sensors; for example, because of production fluctuations, the duration of the transition from "110" to "100" may differ, at a continuous rotation speed, from the duration of the transition from "011" to "010". These deviations then repeat every six signal changes, and can be corrected by way of corresponding correction values at the six memory locations 301, 302, . . . , 306. Further correction values can relate to the production tolerances of the entire rotor, for example deviations at tooth structures 1304 that relate to only one point on the entire rotor 1300. Memory locations for these deviations must then of course be provided for the entire rotor 1300, and a synchronization of further address pointer 30 with rotor 1300 must occur. This can be accomplished, alternatively, either by way of a further sensor or by identifying a point on rotor 1300 in a manner similar to that in FIG. 1, or by way of a learning procedure. A learning procedure of this kind, in particular, evaluates operating phases of the electric motor with a relatively consistent motor speed, for example an operating phase in which a vehicle driven by the electric motor is coasting. In such phases it is possible to "learn" the differences that exist with regard to arrival of the signal transitions, and corresponding correction information can be stored in memory locations 302, 303, etc. This information is then used to output different numbers of position pulses 150 as a function of when the next signal change is expected to arrive.

What is claimed is:

1. An apparatus for processing signals representing an angular position of a shaft of a motor, comprising:
   an evaluating arrangement to evaluate a rotation direction datum of the shaft;
   a non-transitory storage device configured to perform the following:
      store arrival times of the signals in memory locations of a memory (a) in a first sequence in the event of a rotation of the shaft in a first direction, and (b) in a second sequence opposite to the first sequence in the event of a rotation of the shaft in a second direction opposite to the first direction; and
   a processing arrangement to perform a calculation using an arrival time stored most recently in the sequence and an arrival time stored previously in the sequence, and to select the previously stored time one of: (i) in the event of a rotation of the shaft in the first direction, a time required for the calculation, proceeding from the time stored most recently in the first sequence, oppositely to the first sequence; and (ii) in the event of a rotation of the shaft in the second direction, a time required for the calculation, proceeding from the time stored most recently in the second sequence, oppositely to the second sequence;
   wherein the storage device includes at least one address pointer which points to one of the memory location of the most recently stored time or the next free memory location, and wherein the first sequence occurs in the case of the rotation of shaft in the first direction by incrementing the address pointer, and wherein the second sequence occurs in the case of the rotation of the shaft in the second direction by decrementing the address pointer.

2. The apparatus as recited in claim 1, further comprising:
   a digital phase locked loop circuit configured to generate a predefined number of position pulses between two successive signals which each represent an angular position of a shaft of a motor;
   a position counter configured to count the position pulses; and
   a correction unit configured to generate, in the event of a change in the rotation direction of the shaft of the motor, compensation pulses to correct the position counter.

3. The apparatus as recited in claim 2, wherein in the event of the change in the rotation direction of the shaft of the motor, a counting direction of the position counter is changed.

4. The apparatus as recited in claim 2, wherein the correction unit suppresses output of further position pulses when a predefined number of position pulses is reached and a following signal which represents an angular position has not yet arrived.

5. The apparatus as recited in claim 3, wherein the correction unit outputs further position pulses when a predefined number of position pulses is not yet reached and a following signal which represents an angular position has arrived.

6. The apparatus as recited in claim 3, further comprising:
   a second address pointer which points to memory locations in which a datum is contained regarding a number of position pulses to be outputted by the a digital phase locked loop circuit, wherein in the event of a change in the rotation direction of the shaft, the counting direction of the further address pointer is changed and the position of the further address pointer is corrected.

7. The apparatus as recited in claim 6, wherein the two address pointers exhibit a mutual offset having (i) a first value in the event of a rotation of the shaft in a first direction, and (ii) a second value in the event of a rotation in the second direction.

8. The apparatus as recited in claim 6, further comprising:
   modifying unit configured to modify at least one of the two address pointers in the event of a change in the rotation direction of the shaft.

9. A method for processing signals representing an angular position of a shaft of a motor, the method comprising:
   evaluating, via an evaluating arrangement, a rotation direction datum of the shaft;
   storing, via a nontransitory storage device, arrival times of the signals in memory locations of a memory (a) in a first sequence in the event of a rotation of the shaft in a first direction, and (b) in a second sequence opposite to the first sequence in the event of a rotation of the shaft in a second direction opposite to the first direction; and performing a calculation, via a processing arrangement, using an arrival time stored most recently in the sequence and an arrival time stored previously in the sequence for a calculation;

performing a selection, via the processing arrangement, of the previously stored time: (i) in the event of a rotation of the shaft in the first direction, a time required for the calculation, proceeding from the time stored most recently in the first sequence, oppositely to the first sequence; and (ii) in the event of a rotation of the shaft in the second direction, a time required for the calculation, proceeding from the time stored most recently in the second sequence, oppositely to the second sequence;

wherein the storage device includes at least one address pointer which points to one of the memory location of the most recently stored time or the next free memory location, and wherein the first sequence occurs in the case of the rotation of shaft in the first direction by incrementing the address pointer, and wherein the second sequence occurs in the case of the rotation of the shaft in the second direction by decrementing the address pointer.

10. The method as recited in claim 9, wherein:

a digital phase locked loop circuit generates a predefined number of position pulses between two successive signals which each represent an angular position of a shaft of a motor;

a position counter counts the position pulses; and a correction unit generates, in the event of a change in the rotation direction of the shaft of the motor, compensation pulses to correct the position counter.

11. The method as recited in claim 10, wherein in the event of the change in the rotation direction of the shaft of the motor, a counting direction of the position counter is changed.

12. The method as recited in claim 10, wherein the correction unit suppresses output of further position pulses when a predefined number of position pulses is reached and a following signal which represents an angular position has not yet arrived.

13. The method as recited in claim 11, wherein the correction unit outputs further position pulses when a predefined number of position pulses is not yet reached and a following signal which represents an angular position has arrived.

14. The method as recited in claim 11, wherein a second address pointer is provided, and wherein the second address pointer points to memory locations in which a datum is contained regarding a number of position pulses to be outputted by the a digital phase locked loop circuit, wherein in the event of a change in the rotation direction of the shaft, the counting direction of the further address pointer is changed and the position of the further address pointer is corrected.

15. The method as recited in claim 14, wherein the two address pointers exhibit a mutual offset having (i) a first value in the event of a rotation of the shaft in a first direction, and (ii) a second value in the event of a rotation in the second direction.

16. The method as recited in claim 14, wherein at least one of the two address pointers is modified in the event of a change in the rotation direction of the shaft.

* * * * *